United States Patent [19]

Schimmel et al.

[11] 4,327,008

[45] Apr. 27, 1982

[54] URETHANE RHEOLOGY MODIFIERS AND COATING COMPOSITIONS CONTAINING SAME

[75] Inventors: Karl F. Schimmel, Verona; Jerome A. Seiner, Pittsburgh; Roger M. Christenson; Rostyslaw Dowbenko, both of Gibsonia, all of Pa.

[73] Assignee: PPG Industries, Inc., Pittsburgh, Pa.

[21] Appl. No.: 221,146

[22] Filed: Dec. 29, 1980

[51] Int. Cl.$^3$ .................... C08G 18/12; C08G 18/48
[52] U.S. Cl. .................................. 524/104; 525/123; 25/452; 528/69; 528/76; 528/67; 528/44; 524/108; 524/111; 524/233; 524/205; 524/378
[58] Field of Search ............... 260/13, 29.2 TN, 30.2, 260/32.6 NR, 30.4 N, 32.4, 33.2 R; 525/123, 452; 528/76, 69

[56] References Cited

U.S. PATENT DOCUMENTS

| | | | |
|---|---|---|---|
| 3,326,821 | 6/1967 | Lesser | 260/2.5 |
| 3,483,163 | 12/1969 | Sommer et al. | 260/75 |
| 3,939,123 | 2/1976 | Matthews et al. | 260/77.5 AM |
| 4,061,618 | 12/1977 | Stanley et al. | 260/29.2 TN |
| 4,079,028 | 3/1978 | Emmons et al. | 528/85 |
| 4,118,354 | 10/1978 | Harada et al. | 260/29.2 TN |
| 4,131,604 | 12/1978 | Szycher | 528/78 |
| 4,134,610 | 1/1979 | Lindewall | 260/2.5 AP |
| 4,155,892 | 5/1979 | Emmons et al. | 260/29.2 TN |
| 4,180,491 | 12/1979 | Kim et al. | 260/29.2 TN |

*Primary Examiner*—H. S. Cockeram
*Attorney, Agent, or Firm*—Charles R. Wilson

[57] ABSTRACT

Rheology modifiers useful in water-based and organic solvent-based compositions are derived from the reaction of polyalkylene oxide, polyfunctional material, diisocyanate, water and a monofunctional active hydrogen-containing compound or monoisocyanate. The modifiers are characterized by having a branched structure, urea linkages and terminal hydrophobic groups.

44 Claims, No Drawings

URETHANE RHEOLOGY MODIFIERS AND COATING COMPOSITIONS CONTAINING SAME

BACKGROUND OF THE INVENTION

This invention relates to rheology modifiers. More particularly, the invention relates to urethane rheology modifiers especially useful in water and organic solvent-based compositions.

Additives have long been used in coating compositions for various purposes. Thus, viscosity control agents, surfactants, sag-control agents, anti-foaming agents and other materials are added to coating compositions in minor amounts for their respective functions. Rheology modifiers are also added to such compositions not only for increasing the viscosity of the coating compositions but to maintain the viscosity at desired levels under varying process conditions and end-use situations. Secondary effects obtained from the rheology modifiers include protective colloidal action, improvement in pigment suspension, leveling and flow. Some of these properties are also desired in similar type compositions, for instance textile treating compositions, cosmetics, paper compositions, well drilling, firefighting foams, detergents, pharmaceuticals, agricultural formulations, and emulsions of all kinds. It can be seen rheology modifiers are used in a variety of compositions.

Many well-known rheology modifiers are used with varying degrees of success. Thus, natural products such as the alginates, casein, and gum tragacanth and modified natural products such as methyl cellulose and hydroxyethyl cellulose are useful rheology modifiers. Synthetic rheology modifiers have also been used. These materials include the carboxyvinyl ether copolymers, acrylic polymers and maleic anhydride/styrene copolymers. However, the known rheology modifiers have various deficiencies. For example, the natural rheology modifiers are susceptible to biological attack. Synthetic rheology modifiers are not subject to such attack yet most of them do suffer from having less than desirable thickening qualities over a wide range of end uses and/or film forming concentrations.

There is accordingly a need for rheology modifiers which are biologically resistant and which are functional over a wide range of uses and temperatures. Ideally, such rheology modifiers can be used in water-based as well as organic solvent based systems and can be used with many different film forming resins. An added benefit would be if the rheology modifiers imparted many of the secondary properties described above.

As used herein, all percents and ratios are by weight unless otherwise stated.

SUMMARY OF THE INVENTION

Disclosed herein are rheology modifiers derived from the reaction product of:
(a) 8 moles of a polyalkylene oxide;
(b) from about 0.1 moles to about 3 moles of a polyfunctional material;
(c) from about 7 moles to about 30 moles of a diisocyanate;
(d) from about 3 moles to about 14 moles water; and
(e) sufficient monofunctional active hydrogen-containing compound or monoisocyanate to end cap substantially all free isocyanate or hydroxy groups.

The rheology modifiers have a branched structure, urea linkages and terminal hydrophobic groups.

The aforedescribed rheology modifiers are useful in water-based as well as organic solvent-based compositions. The rheology modifiers are especially useful in latex coating compositions.

DETAILED DESCRIPTION OF THE INVENTION

The following paragraphs describe the rheology modifiers, their methods of making and various applications thereof. While the discussion of the reaction products which follows is with reference to them as "rheology modifiers", it should be understood this term is used broadly. That is, "rheology modifiers" is meant to encompass such terms as thickening agents, thixotropic agents, viscosity modifiers and gelling agents.

The rheology modifiers useful herein are derived from the reaction of polyalkylene oxides, polyfunctional materials, diisocyanates, water and monofunctional active hydrogen-containing compounds or monoisocyanates. The modifiers have a branched chain structure and contain urea linkages. The rheology modifiers are further characterized in having terminal hydrophobic groups.

Polyalkylene oxides used in the reaction include the polyethylene oxide diols, polypropylene oxide diols, and polybutylene oxide diols. These materials have a molecular weight of from about 2,000 to about 20,000, preferably from about 4,000 to about 12,000. The aforementioned molecular weights are weight average molecular weights determined by gel permeation chromatography, using a polystyrene standard. The polyethylene oxide is a preferred polyalkylene oxide, especially when the resultant rheology modifier is used in water-based compositions. Eight (8) moles of the polyalkylene oxide is used in the reaction, with the molar amounts of the other reactants based on this 8 moles.

The polyfunctional material has either at least 3 active hydrogens and is capable of reacting with an isocyanate or is a polyisocyanate with at least 3 isocyanate groups. Classes of materials useful as the polyfunctional material include polyols, amines, amine alcohols, thiols and polyisocyanates. The preferred polyfunctional material is a polyol having a hydroxyl functionality of at least three. Examples of such materials include the polyalkylols, e.g., trimethylolpropane, trimethylolethane and pentaerytriol; the polyhydroxyalkanes, e.g., glycerol, erythritol, sorbitol, and mannitol; polyhydric alcohol ethers such as those derived from the aforementioned alcohols and alkylene oxides; cycloaliphatic polyhydric coounds, e.g., trihydroxyl cyclohexanes; and aromatic compounds such as trihydroxybenzene. Preferred polyols are the trifunctional alcohols, especially trimethylolpropane. Additional examples of polyfunctional materials include diethylenetriamine; triethylenetetramine; diethanolamine; triethanolamine; triisopropanolamine; trimercaptomethylpropane; triphenyl methane-4,4',4"-triisocynate; 1,3,5-triisocyanate benzene; 2,4,6-triisocyanate toluene; 4,4'-diphenyl-dimethyl-methane-2,2'-5,5'-tetraisocyanate; and hexamethylene diisocyanate trimer, such as Mobay Chemical Company's Desmodur N. The level of polyfunctional material ranges from about 0.1 moles to about 3 moles, preferably from about 1 mole to about 3 moles based on each 8 moles of the polyalkylene oxide.

A third component used in the reaction mixture is a diisocyanate at a level of from about 7 moles to about 30 moles, preferably from about 15 moles to about 30 moles, based on each 8 moles of polyalkylene oxide. Several different hydrocarbon or substituted hydrocarbon diisocyanates are useful including the aliphatic, cycloaliphatic and aromatic diisocyanates either alone or in admixture. Generally available diisocyanates have the formula OCNRNCO where R is arylene, e.g., phenylene and diphenylene; alkylarylene, e.g, dimethylbiphenylene, methylenebisphenyl and dimethylmethylenebisphenylene; alkylene, e.g., methylene, ethylene, tetramethylene, hexamethylene, a 36 methylene species, and trimethylhexylene; and alicyclic, e.g., isophorone and methylcyclohexylene. Still other useful diisocyanates include those of the above formula where R is a hydrocarbon group containing ester or ether linkages. Specific examples of suitable diisocyanates include 1,4-tetramethylene diisocyanate, 1,6-hexamethylene diisocyanate; 2,2,4-trimethyl-1,6-diisocyanato hexane; 1,10-decamethylene diisocyanate; 1,4-cyclohexylene diisocyanate; 4,4'-methylene bis (isocyanato cyclohexane); p-phenylene diisocyanate; 2,6-toluene diisocyanate; 2,4-toluene diisocyanate; xylene diisocyanate; isophorone diisocyanate; bis para-isocyanato cyclohexylmethane; 4,4-biphenylene diisocyanate; 4,4-methylene diphenyl isocyanate; 1,5-napthalene diisocyanate; and 1,5-tetrahydronapthalene diisocyanate. Preferred are the toluene diisocyanates and the cycloaliphatic diisocyanates, especially isophorone diisocyanate and bis para-isocyanato cyclohexylmethane.

A fourth component used in the reaction mixture is water. The water is used at a level to give from about 3 to about 14 moles, preferably from about 6 moles to about 12 moles water for each 8 moles polyalkylene oxide. It should be understood that oftentimes the components other than the diisocyanate used in the reaction as well as any solvent medium used will contain water, usually in trace amounts. It is necessary the water brought into the reaction mixture by these sources be accounted for and adjusted either by partially drying the reaction mixture or adding more water so as to come within the proper level of water as above indicated. The level of water used in the reaction is important with respect to the viscosity modifying characteristics found in the rheology modifier. It is theorized the water is responsible for the formation of urea linkages and other groups within the molecule which, surprisingly, provide desired rheology modifying characteristics to the produced product.

Components in addition to those discussed above can be included in the reaction mixture provided they do not interfere with the reaction or materially affect the properties of the resultant rheology modifier. Thus, components such as monofunctional materials, non-polyalkylene oxide polyols and lower molecular weight polyols can be included in the reaction mixture at low levels, generally less than about 10% by weight. Preferably, however, the rheology modifiers of this invention are derived solely from the four components discussed in the paragraphs immediately above together with the end-capping compounds discussed below.

A convenient first step in the making of the rheology modifiers comprises blending the above components together in the presence of a solvent medium and heating to a temperature ranging from about 100° C. to about 130° C. Alternatively, the components can be individually added in any order and reacted at the aforementioned elevated temperature. The reaction is allowed to proceed until constant viscosity is achieved.

Any of several inert solvents can be used as the solvent medium, the only criteria being that all the components be either soluble or dispersible therein. Thus, benzene, toluene, xylene, ethyl acetate, butyl acetate and the dialkyl ethers of ethylene glycol and diethylene glycol can be used. Preferred, however, for use as the solvent medium is an organic solvent which is compatible with a water-based or organic solvent-based coating composition. Compatible solvents are preferred since it is a desired objective that the rheology modifier as made be added directly to a coating composition without a need to remove any incompatible solvent medium used in its preparation. This objective is particularly difficult to meet with water-based coating compositions. Solvents found to be especially compatible with the coating compositions, including the water-based compositions, include 1-methyl-2-pyrrolidinone, dimethyl formamide, dimethyl acetamide, gamma butyrolactone, dioxane, dimethyl and diethyl ethers of ethylene glycol and diethylene glycol, and acetonitrile.

After the above reactants are reacted in the manner discussed, there is added either a monofunctional active hydrogen-containing compound or a monoisocyanate. The monofunctional active hydrogen-containing compound is used in the reaction discussed in preceeding paragraphs when an excess of isocyanate groups is present, while a monoisocyanate is used when an excess of hydroxyl groups is present. The purpose of this addition is to end-cap substantially all free isocyanate or hydroxyl groups. Accordingly, the amount of end-capping material added is dependent on the amount of other reactants in the reaction. The exact amount needed to end-cap free isocyanate or hydroxyl groups is readily calculated. A further check that substantially all active end groups have been capped can be made after the addition by analytically determining the free isocyanate content or hydroxyl value of the mixture.

Examples of monofunctional active hydrogen compounds include aliphatic alcohols such as ethanol, octanol, dodecanol and hexadecanol; fatty acids; phenolics such as phenol, cresol, octylphenol and dodecyl phenol; and alcohol ethers such as the monomethyl, monoethyl and monobutyl ethers of ethylene glycol and diethylene glycol. Examples of monoisocyanates include the straight chain, branched chain and acrylic isocyanates such as butyl isocyanate, octyl isocyanate, dodecyl isocyanate, octadecyl isocyanate and cyclohexyl isocyanate. The temperature maintained during the end-capping step can vary widely, e.g. from about 20° C. to about 140° C.

In a preferred method of making the rheology modifiers, a polyhydric material such as ethylene glycol, propylene glycol, or glycerine is added after the end-capping step. This addition reduces the mixture's viscosity thereby making it easier to handle. For maximum ease of handling, the mixture's temperature is about 100° C. to about 130° C. while the polyhydric material is added. The amount of polyhydric material added can vary widely, generally with amounts from about 50% to about 500% of the polyhydric material, based on the reactive components, being used.

The aforedescribed modifiers can be used in water-based compositions as well as organic solvent-based compositions. They are most useful in coating compositions, as below described, especially the water-based latex coating compositions.

Latex coating compositions can be made from many different water-insoluble polymeric film-forming materials which are capable of forming a dispersion in water. Especially useful film-forming polymeric resins are the acrylic resins which are the polymerized ester derivatives of acrylic acid and methacrylic acid. The esters are formed by the reaction of acrylic or methacrylic acid with a suitable alcohol, e.g., methyl alcohol, ethyl alcohol, propyl alcohol and butyl alcohol. Generally speaking, the larger the alcoholic portion of the ester, the softer or more flexible the resultant resin. Monomers such as styrene, vinyl toluene, vinyl chloride and vinylidene chloride can be reacted with the acrylic and methacrylic esters to produce resins having excellent properties. Copolymers of acrylic resins with each other or with other monomers of acrylic or methacrylic acids and their derivatives such as methyl acrylate, methyl methacrylate, ethyl acrylate, ethyl methacrylate, butyl acrylate, butyl methacrylate, acrylamide, and acrylonitrile are useful. Still other polymeric resins include the vinyl resins derived from monomers containing a carbon to carbon double bond. These monomers polymerize by linear addition to form long-chain molecules. The vinyl monomers can have various pendant groups such as chlorine, acetate and aromatic groups. The vinyl resins are commonly derived from monomers such as vinyl chloride, vinylidine chloride, vinyl acetate, styrene, acrylonitrile and mixtures thereof.

The water-insoluble polymeric resins have a particular diameter of less than about 1 micron, preferably from about 0.05 microns to about 0.5 microns and are suspended in water. These compositions are oftentimes referred to as either emulsions or latexes. A typical latex coating composition contains from about 5% to about 70%, preferably from about 20% to about 35% of the aforedescribed film-forming polymeric resins and from about 0.1% to about 10%, preferably from about 1% to about 5%, based on the film-forming polymeric resin, of the rheology modifier.

Other film-forming resins which can be either water-solubilized or dissolved in organic solvents include the epoxy, vinyl, alkyd, polyester, acrylic, aminoplast, phenoplast, cellulose derivatives, amide or urethane resins or mixtures thereof. Copolymers derived from such resins are also useful. These resins are further described in commonly assigned U.S. Ser. No. 166,643, filed July 7, 1980, Becher et al, "Pigment Dispersants for Coating Compositions", the disclosure of which is herein incorporated by reference.

Several different organic solvents can be used as a liquid carrier for the coating compositions. Examples of such solvents include hydrocarbons and halogenated hydrocarbons such as toluene, xylene, mineral spirits, hexane, cyclohexane, chlorobenzene and perchloroethylene.

Additives commonly used in coating compositions can be used. Such additives include plasticizers, fillers, surfactants, stabilizers and pigments.

The coating compositions are applied by conventional coating techniques onto a variety of substrates. Thus the compositions can be applied by spraying, dipping, brushing, flowcoating and roll-coating. Substrates that can be coated include wood, metals, glass, plastics, and wallboard.

The examples which follow are illustrative of the invention.

EXAMPLE I

A rheology modifier is derived from the following reactants according to the procedure set out below:

|  | Molar ratio |
|---|---|
| Polyethylene oxide (M.W. 8000) | 8.0 |
| Trimethylolpropane | 1.4 |
| Bis para-isocyanato cyclohexylmethane | 21.0 |
| Water | 12.0 |
| Octadecyl isocyanate | 2.2 |

A reaction vessel is initially charged with 400 parts 1-methyl-2-pyrrolidinone (available from GAF Corp. and hereinafter referred to as M-pyrol), 10 parts cyclohexane, 500 parts polyethylene oxide (available from Union Carbide Corp. as Carbowax 6000) and 1.5 parts trimethylolpropane. The reaction vessel is now heated to azeotrope off 65 parts water. The water content of the mixture is checked and adjusted so as to have 1.68 parts water in the mixture. A 1% dibutyl tin dilaurate catalyst solution in M-pyrol is then added at a level of 10 parts while maintaining the reaction temperature at 110° C. Forty-three and two-tenths (43.2) parts of bis para-isocyanato cyclohexylmethane (available from E. I. Dupont de Nemours and Co. as Hylene W) is next added using an isocyanate pump, followed by a rinse with 10 parts M-pyrol. After about a one-hour hold period, 10 additional parts of the M-pyrol and 4.4 parts octahexyl isocyanate is added. This is followed by an addition of 1,548 parts propylene glycol. The viscosity of the mixture is determined to be Z-6 after a two-hour hold period. After another hold period of about two hours at 120° C., 502 parts deionized water and 501 parts proxylene glycol are added. The final reaction mixture has a viscosity of Z-3 to Z-4 and a 15% solids content.

EXAMPLE II

The above rheology modifier is tested using the following coating composition.

|  | Parts by Weight |
|---|---|
| Acrylic latex[1] | 368 |
| Rheology modifier solution (15% solids) | 50 |
| Water | 148 |
| Amino methyl propanol | 1 |
| Dispersant[2] | 2 |
| Surfactant[3] | 12 |
| Defoamer[4] | 8 |
| Phenyl mercuric acetate | 0.5 |
| Calcium carbonate | 119 |
| Barium sulfate | 190 |
| Hydroxyethyl cellulose | 2 |
| Coalescent | 12 |
| Ethylene glycol | 15 |
| Clay slurry (68% solids) | 104 |

[1] Available from Rohm & Haas Co. as AC-490. 46.5% solids
[2] Available from Rohm & Haas Co. as Tamol 731
[3] A blend of Strodex SEB-30 (Dexter Chem. Co.), Igepal COQ10 (General Amiline & Film Corp.) and Triton GR-7M (Rohm & Haas Co.), in a 2:8:2 ratio.
[4] Available from Drew Chem. Co. as DREW L-475
[5] Available from the Dow Chem. CO. as Dalpad A Viscosities of the above coating composition are 20,00 centipoises and 6,800 centipoises at 6 and 60 rpm, respectively using a Brookfield #4 spindle versus 3600 and 970 centipoises for the same composition without the rheology modifier.

EXAMPLE III

An organic solvent based composition containing a rheology modifier is formulated as follows:

|  | Parts by Weight |
|---|---|
| Long oil/soya alkyd resin | 17.3 |
| Sunflower/soya alkyd resin | 31.7 |
| Rheology modifier solution of Example I (15% solids) | 1.7 |
| Mineral spirits | 13.1 |
| Ethylene glycol monophenyl | 1.6 |
| Soya lecithin | 0.4 |
| Cobalt feeder drier | 0.1 |
| Calcium drier | 0.4 |
| Cobalt drier | 0.1 |
| Manganese drier | 0.1 |
| Zirconium drier | 0.6 |
| Surfactant[1] | 0.5 |
| Surfactant[2] | 0.2 |
| Aluminum silicate | 2.3 |
| Silica | 2.3 |
| Calcium carbonate | 15.5 |
| Titantium dioxide | 8.3 |
| Soya oil | 3.3 |
| Methyl ethyl ketoxime | 0.5 |

[1] Available from General Aniline and Film Co. as Igepal CO 430
[2] Available from Atlas Chem. Industries as Atlas G-330

After 24 hours and one week (stored at 49° C.), the above composition has a viscosity of 95 and 92 Krebs units, respectively versus 79 and 75 Krebs units, respectively for the same composition without the rheology modifier, thereby demonstrating the utility of the rheology modifiers of this invention in organic solvent-based compositions.

What is claimed is:

1. A urethane rheology modifier characterized in having a branched structure and terminal hydrophobic groups, derived from the reaction of:
   (a) for each 8 moles of a polyalkylene oxide having a molecular weight of from about 2,000 to about 20,000;
   (b) from about 0.1 moles to about 3 moles of a polyfunctional material, said material being a compound having at least 3 active hydrogens capable of reacting with isocyanate or a polyisocyanate having at least 3 isocyanate groups;
   (c) from about 7 moles to about 30 moles of a diisocyanate;
   (d) from about 3 moles to about 14 moles water; and
   (e) sufficient monofunctional active hydrogen-containing compound or monoisocyanate to end-cap substantially all free isocyanate or hydroxy groups.

2. The rheology modifier of claim 1 wherein the polyfunctional material is selected from the group consisting of polyols, amines, amine alcohols, thiols, polyisocyanates, and mixtures thereof.

3. The rheology modifier of claim 2 wherein the polyfunctional material is the polyisocyanate.

4. The rheology modifier of claim 2 wherein the polyfunctional material is the polyol.

5. The rheology modifier of claim 4 wherein the polyol is a trifunctional alcohol.

6. The rheology modifier of claim 5 wherein the trifunctional alcohol is trimethylolpropane.

7. The rheology modifier of claims 1 or 6 wherein the polyalkylene oxide is a polyethylene oxide.

8. The rheology modifier of claim 7 wherein the polyethylene oxide has a molecular weight of from about 4,000 to about 12,000.

9. The rheology modifier of claim 8 wherein the diisocyanate is selected from the group consisting of toluene diisocyanate, isophorone diisocyanate, bis para-isocyanato cyclohexylmethane and mixtures thereof.

10. The rheology modifier of claim 1 wherein the rheology modifier is derived from the reaction of from about 1 mole to about 3 moles of the polyfunctional material and from about 15 moles to about 30 moles of the diisocyanate for each 8 moles of the polyalkylene oxide.

11. The rheology modifier of claim 10 wherein from about 6 moles to about 12 moles water are used.

12. The rheology modifier of claim 11 wherein polyethylene oxide, trimethylolpropane, bis para-isocyanato cyclohexylmethane and water are reacted.

13. The rheology modifier of claim 12 wherein an aliphatic alcohol is used to end-cap free isocyanate groups.

14. A process for making a urethane rheology modifier characterized in having a branched structure and terminal hydrophobic groups, comprising the steps of:
   (1) reacting in an inert organic solvent
      (a) for each 8 moles of a polyalkylene oxide having a molecular weight of from about 2,000 to about 20,000;
      (b) from about 0.1 moles to about 3 moles of a polyfunctional material, said material being a compound having at least 3 active hydrogens capable of reacting with isocyanate or is a polyisocyanate having at least 3 isocyanate groups;
      (c) from about 7 moles to about 30 moles of a diisocyanate; and
      (d) from about 3 moles to about 14 moles water; and
   (2) end-capping the reaction product of step (1) with sufficient amount of a monofunctional active hydrogen-containing compound or a monoisocyanate so as to cap substantially all free isocyanate or hydroxyl groups.

15. The process of claim 14 wherein the organic solvent is compatible with a water-based coating composition.

16. The process of claim 14 wherein the organic solvent is compatible with an organic solvent-based coating composition.

17. The process of claim 15 wherein the organic solvent is selected from the group consisting of 1-methyl-2-pyrrolidinone, dimethylformamide, dimethyl acetamide, gamma butyrolactone, dioxane, acetonitrile, dimethyl and diethyl ethers of ethylene glycol and diethylene glycol, and mixtures thereof.

18. The process of claim 17 wherein the organic solvent is 1-methyl-2-pyrrolidinone.

19. The process of claim 15 wherein a polyhydric material is added after the addition of the monofunctional active hydrogen-containing compound or monoisocyanate.

20. The process of claim 19 wherein the polyhydric material is selected from the group consisting of ethylene glycol, propylene glycol, glycerine, and mixtures thereof.

21. The process of claim 20 wherein the polyhydric material is propylene glycol.

22. The process of claim 19 wherein the temperature of the mixture is maintained at from about 100° C. to about 130° C. while the polyhydric material is added.

23. The process of claim 14 wherein the mixture of step (1) is reacted at a temperature ranging from about 100° C. to about 130° C.

24. The process of claim 14 wherein the polyfunctional material is selected from the group consisting of polyols, amines, amine alcohols, thiols, polyisocyanates and mixtures thereof.

25. The process of claim 24 wherein the polyfunctional material is the polyisocyanate.

26. The process of claim 24 wherein the polyfunctional material is a trifunctional alcohol.

27. The process of claim 26 wherein the polyalkylene oxide is a polyethylene oxide having a molecular weight of from about 4,000 to about 12,000.

28. The process of claim 27 wherein the diisocyanate is selected from the group consisting of toluene diisocyanate, isophorone diisocyanate, bis para-isocyanato cyclohexylmethane and mixtures thereof.

29. The process of claim 28 wherein the mixture of step (1) comprises from about 1 mole to about 3 moles of the polyfunctional material and from about 15 moles to about 30 moles of the diisocyanate for each 8 moles of the polyalkylene oxide.

30. The process of claim 29 wherein from about 6 moles to about 12 moles water is used.

31. The process of claim 30 wherein polyethylene oxide, trimethylolpropane, bis para-isocyanato cyclohexylmethane and water are reacted.

32. A coating composition consisting essentially of a film-forming polymeric resin and about 0.1% to about 10%, based on the film-forming polymeric resin solids, of a rheology modifier, said modifier characterized in having a branched structure, terminal hydrophobic groups and derived from the reaction of:
 (a) for each 8 moles of a polyalkylene oxide having a molecular weight of from 2,000 to about 20,000;
 (b) from about 0.1 moles to about 3 moles of a polyfunctional material, said material being a compound having at least 3 active hydrogens capable of reacting with isocyanates or is a polyisocyanate having at least 3 isocyanate groups;
 (c) from about 7 moles to about 30 moles of a diisocyanate;
 (d) from about 3 moles to about 14 moles water; and
 (e) sufficient monofunctional active hydrogen-containing compound or monoisocyanate to end-cap substantially all free isocyanate or hydrogen groups.

33. The composition of claim 32 wherein the polyfunctional material is selected from the group consisting of polyols, amines, amine alcohols, thiols, polyisocyanates, and mixtures thereof.

34. The composition of claim 33 wherein the polyfunctional material is the polyisocyanate.

35. The composition of claim 33 wherein the polyfunctional material is the polyol.

36. The composition of claim 35 wherein the polyol is a trifunctional alcohol.

37. The composition of claim 36 wherein the trifunctional alcohol is trimethylolpropane.

38. The composition of claims 34 or 35 wherein the polyalkylene oxide is polyethylene oxide having a molecular weight of from about 4,000 to about 12,000.

39. The composition of claim 38 wherein the diisocyanate is selected from the group consisting of toluene diisocyanate, isophorone diisocyanate, bis para-isocyanato cyclohexylmethane and mixtures thereof.

40. The composition of claim 32 wherein the rheology modifier is derived from about 1 mole to about 3 moles of the polyfunctional material and from about 15 moles to about 30 moles of the diisocyanate for each 8 moles of the polyalkylene oxide.

41. The composition of claim 40 wherein from about 6 moles to about 12 moles water is used.

42. The composition of claim 32 wherein the film-forming resin is an epoxy, vinyl, alkyd, polyester, acrylic, aminoplast, phenolplast, cellulose derivative, amide or urethane resin or mixture thereof.

43. The composition of claim 32 wherein the film-forming resin is a latex resin.

44. The composition of claim 43 wherein the composition contains from about 5% to about 70% of the polymeric film-forming resin.

* * * * *